Dec. 20, 1966  L. COTT  3,292,669
MITER GAUGE FOR PORTABLE ELECTRIC SAW
Filed Aug. 3, 1964
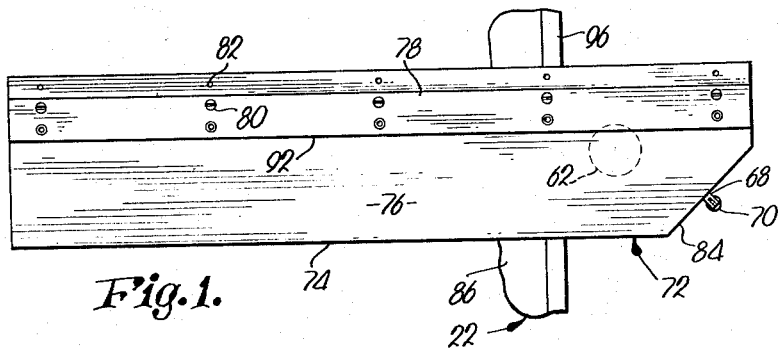
Fig.1.
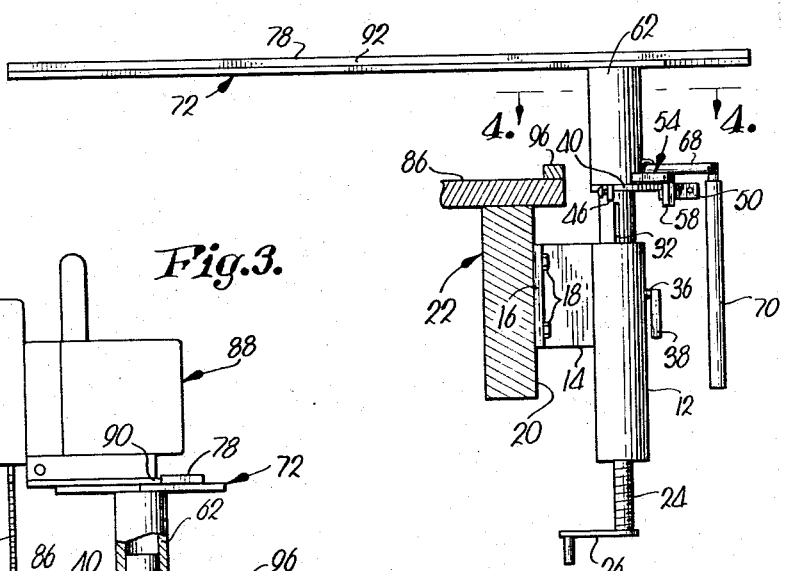
Fig.3.
Fig.2.
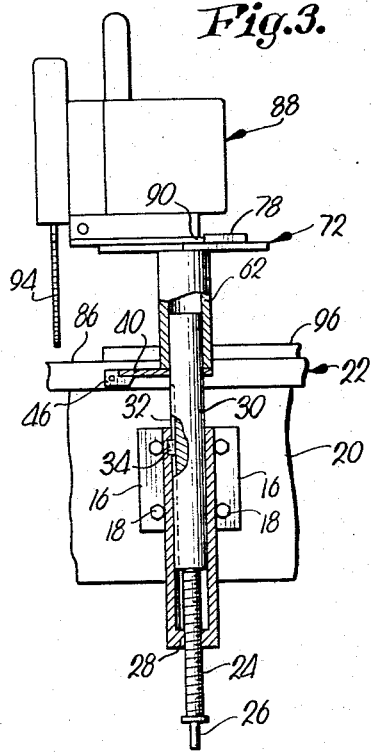
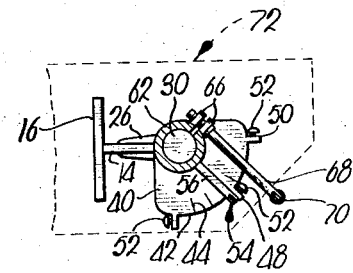
Fig.4.
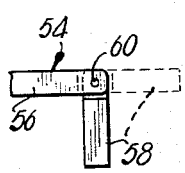
Fig.5.
INVENTOR.
Lawrence Cott
BY
Hovey, Schmidt, Johnson & Hovey
ATTORNEYS.

United States Patent Office 3,292,669
Patented Dec. 20, 1966

3,292,669
MITER GAUGE FOR PORTABLE ELECTRIC SAW
Lawrence Cott, Gilliam, Mo. 63701
Filed Aug. 3, 1964, Ser. No. 387,032
4 Claims. (Cl. 143—6)

This invention relates to apparatus for supporting a portable electric saw and has as its primary object the provision of miter apparatus which can be secured to a workbench and disposed to support a portable electric saw in any one of a number of angular dispositions with respect to and above a workpiece carried on the workbench, while at the same time eliminating any need for attaching the saw to the miter apparatus, whereby the saw may be used in the conventional manner or may be used with the apparatus of the instant invention to form miter joints without connecting or disconnecting the same to the apparatus.

Another object of the present invention is the provision of miter apparatus of the type described which includes a saw-supporting platform which can be readily raised or lowered to accommodate workpieces of varying thicknesses, or which can be readily rotated with respect to a workbench on which the workpiece is disposed so as to permit the cutting of miter joints by the saw supported on the platform.

A further object of this invention is the provision of miter apparatus of the aforesaid character which is simple in construction, can be readily attached to a workbench with no special tools, is easy to use without requiring special skills on the part of the user, and can be utilized with different types and sizes of portable electric saws.

Still another object of the present invention is the provision of miter apparatus of improved construction which can be releasably locked in any one of a number of operative positions after the apparatus has been positioned at a desired cutting location so that a workpiece can be accurately cut along a desired line corresponding to the position of the apparatus.

In the drawing:

FIGURE 1 is a top plan view of the miter apparatus illustrating its position with respect to a workbench to which it is secured;

FIG. 2 is a side elevational view of the miter apparatus shown mounted at one side of a workbench;

FIG. 3 is an end elevational view of the apparatus, parts being broken away and in section to illustrate details of construction;

FIG. 4 is a cross-sectional view taken along line 4—4 of FIG. 2; and

FIG. 5 is an enlarged, side elevational view of the projection coupled to and rotatable with the saw-supporting platform of the apparatus for limiting the rotation of the platform with respect to a workpiece on the workbench.

The present invention provides miter apparatus which can be readily attached to a workbench and includes a spindle having means thereon for mounting the same in an upright position at one side of a workbench. A saw-supporting platform has a sleeve rigid to and extending downwardly from the lower surface thereof, the sleeve being telescoped over the upper end of the spindle and being supported by a plate rigid to and extending laterally from the spindle intermediate the ends thereof. The sleeve is provided with a slit therein and structure thereon adjacent the slit for clamping the sleeve to the spindle. The plate has an arcuate, outermost edge provided with circumferentially spaced, adjustable stops which are disposed within the path of rotation of a projection rigid to and extending laterally from the sleeve. The height of the spindle can be adjusted to accommodate workpieces of varying thicknesses. A guide is adjustably mounted on the platform to accommodate the latter for portable electric saws of different types.

Miter apparatus 10 includes a tube 12 rigid to one extremity of a T-shaped bracket 14 having flanges 16 provided with holes therethrough for receiving screws 18 for attaching bracket 14 to the side 20 of a workbench 22.

A screw 24, having an L-shaped handle 26 at the lower end thereof, is threadably mounted in the bottom end 28 of tube 12. The upper end of screw 24 supports a spindle 30 which is shiftably received within tube 12 and extends upwardly through the open upper end thereof.

Spindle 30 is provided with a groove 32 extending longitudinally thereof for receiving a key 34 rigid to and projecting radially inwardly from the inner surface of tube 12. Spindle 30 is thus free to move longitudinally of tube 12 but is prevented from rotating with respect thereto. A setscrew 36, having a handle 38, is threaded into tube 12 and normally bears against the outer surface of spindle 30 to releasably maintain the latter in a fixed position relative to tube 12.

A plate 40 is rigid to and extends laterally from spindle 30 intermediate the ends of the latter. Plate 40 is provided with an arcuate, outermost edge 42, in partially surrounding relationship to spindle 30, the margin of plate 40 adjacent to edge 42 thereof being provided with spaced indicia 44 thereon.

A number of circumferentially spaced extensions 46, 48 and 50 are rigid to the underside of plate 40 and extend radially outwardly therefrom. Each of said extensions is provided with a screw element 52 threadably mounted therein and providing stops for a projection 54 having a pair of sections 56 and 58 pivotally interconnected by a pin 60.

Section 56 is rigid to and extends laterally from a sleeve 62 in close proximity to the upper face of plate 40 as shown in FIG. 2. The outer end of section 56 terminates adjacent to edge 42, and section 68 normally extends downwardly along edge 42. Sleeve 62 is telescoped over and rotatable with respect to the upper end of spindle 30, the lower end of sleeve 62 being in sliding engagement with the upper face of plate 40. In this position of sleeve 62, section 58 is disposed for engaging screw elements 52 of the proximal pair of extensions. For instance, if sleeve 62 is in the position shown in FIG. 4, section 58 may be moved between screw elements 52 of extensions 46 and 48. Sleeve 62 will thus be able to move through a predetermined arc determined by the arcuate distance between screw elements 52 of extensions 46 and 48. Variations in this arcuate distance can be made by adjusting the positions of screw elements 52 on respective extensions 46 and 48. Section 58 is movable into the dashed-line position thereof shown in FIG. 5 so as to clear the proximal extensions inasmuch as the upper margins of extensions 46, 48 and 50 are coextensive with the upper face of plate 40 as shown in FIG. 3.

Sleeve 62 is provided with a slit 64 extending longitudinally thereof to its lower end. A pair of ears 66 extend laterally from sleeve 62 on opposed sides of slit 64 adjacent to the lower end of sleeve 62. A bolt 68, having a handle 70 hingedly interconnected thereto, is coupled with ears 66 to draw the latter together and thereby moving the edges of sleeve 62 defining slit 64 toward each other. As a result, sleeve 62 is releasably clamped to the upper end of spindle 30.

A saw-supporting platform 72 is rigidly secured to the upper end of sleeve 62 and extends laterally therefrom.

Platform 72 includes a plate 74 having an upper, saw-supporting surface 76 on which is disposed an elongated, saw-engaging guide 78. Guide 78 is secured by screws 80 to plate 74. In this respect, the effective width of surface 76 can be varied by providing laterally spaced, internally threaded holes 82 in plate 74 into which screws 80 may be threadably secured. Thus, guide 78 may be positioned at an intermediate location shown in FIG. 1, at an inner location disposed more toward the center of surface 76 than that shown in FIG. 1, or adjacent to the proximal longitudinal edge of plate 74. One end of plate 74 is disposed directly above bolt 68 and, to permit clearance of handle 70 as bolt 68 is rotated, plate 74 is cut away to form an angular edge 84 as shown in FIG. 1.

In operation, apparatus 10 is initially coupled to work bench 22 by securing bracket 14 to side 20 by screws 18. The initial position of spindle 30 with respect to the upper surface 86 of workbench 22 is set by manipulating handle 26 to rotate screw 24. After spindle 30 has been set to the desired height, screw 36 is tightened to releasably secure spindle 30 to tube 12.

The angularity of platform 72 relative to a workpiece on surface 86 is set by rotating sleeve 62, while bolt 68 is loosened. Assuming the proper location of platform 72 has been reached, bolt 68 is tightened by manipulating handle 70 so as to clamp sleeve 62 to the upper end of spindle 30 and thereby releasably secure platform 72 to tube 12. A portable electric saw 88 is then placed onto surface 76 with the guide plate 90 of saw 88 in engagement with the longitudinally extending side edge 92 of guide 78. The saw blade 94 of saw 88 will then extend downwardly toward surface 86 of workbench 22 and can then be moved into cutting relationship with a workpiece on surface 86 as saw 88 traverses platform 72. In this respect, a fixed guide 96 may be provided on surface 86 to hold the workpiece in place as blade 94 moves through the workpiece.

If it is desired to change the angularity of platform 72 with respect to workbench 22, bolt 68 is loosened to permit rotation of sleeve 62 on spindle 30. As illustrated, extensions 46 and 48 permit rotation of sleeve 62 and thereby platform 72 through an angle of 45 degrees. Sleeve 62 can be clamped at any location corresponding to an operative location of section 58 between extensions 46 and 48. For purposes of illustration, platform 72 is perpendicular to guide 96 when projection 54 is in the position shown in FIG. 4. Platform 72 is shown in dashed lines in FIG. 4. Hence, platform 72 may be rotated through an angle of 45 degrees in a clockwise sense when viewing FIG. 4.

To rotate platform 72 in a counterclockwise sense when viewing FIG. 4, section 58 must be swung to the dashed line position thereof shown in FIG. 5 and then sleeve 62 rotated in a counterclockwise sense when viewing FIG. 4 until section 58 may be disposed between extensions 48 and 50. Thereafter, platform 72 may be shifted through an arcuate distance determined by the arcuate distance between screw elements 52 of extensions 48 and 50. Although any disposition of extensions 46, 48 and 50 may be utilized, for purposes of illustration, sleeve 62 moves through an arcuate distance of 45 degrees when the same is rotated in a counterclockwise sense from the position thereof shown in FIG. 4 to a position at which section 58 contacts extension 50 or screw element 52 thereof.

Miter apparatus 10 may be utilized without requiring that saw 88 be connected thereto in any way. Saw 88 can thus be used in the conventional manner or placed on platform 72 for sawing a workpiece on surface 86.

Changes in the angular position of platform 72 may be quickly made without having to remove a workpiece from workbench 22. Moreover, platform 72 may be easily raised and lowered while the workpiece remains on surface 86. To properly secure bracket 14 to side 20, all of the holes in flanges 16 except one, can be slotted to permit leveling of platform 72 as apparatus 10 is secured to workbench 22. Shims could be used between the upper or lower portions of flanges 16 and side 20 to level platform 72 if one end thereof is below the opposite end, when viewing FIG. 2.

Having thus described the invention, what is claimed as new and desired to be secured by Letters Patent is:

1. Miter apparatus for use with a portable electric saw for sawing a workpiece disposed on a stationary support, said apparatus comprising:

a spindle; an upright tube adapted to be secured to said support and telescopically receiving said spindle, the latter being shiftable relative to said tube; means releasably maintaining said spindle in any one of a number of operative positions within said tube;

a pair of stops rigidly coupled to and extending outwardly from said spindle above said mounting means thereof with said stops being circumferentially spaced from each other with respect to the longitudinal axis of the spindle;

a saw-supporting platform;

means mounting said platform on said spindle above said stops for rotation relative thereto;

a projection coupled with and extending outwardly from said platform for rotation therewith, said stops being across the path of travel of said projection to limit the rotation of said platform; and means releasably securing the platform to said spindle.

2. Miter apparatus for use with a portable electric saw for sawing a workpiece disposed on a stationary support, said apparatus comprising:

a bracket having means thereon for securing the same to the side of said support;

a tube rigidly secured to the bracket and being substantially vertically disposed when said bracket is secured to said support, said tube having an open upper end and a screw threadably mounted on the lower end of and extending into said tube;

a spindle shiftably disposed within said tube and extending outwardly therefrom through the upper, open end thereof, said spindle resting on said screw and provided with a key coupled with said tube for preventing rotation of the spindle relative to the tube;

a plate rigid to and extending laterally from said spindle intermediate the ends thereof and above said upper end of the tube, said plate being provided with an arcuate, outermost edge disposed in partially surrounding relationship to said spindle;

a number of circumferentially spaced extensions rigid to and projecting laterally from said edge;

a screw element for each extension respectively, the screw elements being threadably mounted on respective extensions;

a saw-supporting platform having an upper, saw-engaging surface and a lower surface;

an elongated, saw-engaging guide;

means adjustably mounting said guide on said platform adjacent to one longitudinal edge thereof;

a sleeve rigid to and extending downwardly from said lower surface and having a pair of spaced, longitudinally extending side edges defining a slit therein extending to the lower end thereof, said sleeve being telescoped over the upper end thereof and being rotatable with respect thereto with the lower end of the sleeve being in sliding engagement with the upper face of said plate;

means on said sleeve adjacent to said lower end thereof for moving said side edges toward each other and thereby releasably clamping the sleeve to the spindle; and a projection having a pair of hingedly interconnected sections, one of the sections being rigid to said sleeve and extending laterally therefrom, the other section being swingable on the outer end of said one section for movement about a horizontal axis, said other section normally being disposed downwardly and movable into engagement with a pair of adjacent screw elements to limit the rotation of said sleeve and thereby said platform to an arc defined by said pair of adjacent screw elements, said other section being swingable upwardly to a position clearing said screw elements, whereby said other section may be disposed between another pair of adjacent screw elements to limit the platform to the arc defined thereby.

3. Miter apparatus for use with a portable electric saw for sawing a workpiece disposed on a stationary support, said apparatus comprising:
- an upright spindle element;
- a tube element telescopically receiving said spindle element, one of said elements being shiftable relative to the other element, the latter being adapted to be secured to said support;
- a saw-supporting platform;
- means mounting said platform on said one element for rotation relative thereto;
- means releasably securing the platform to said one element; and
- means associated with said elements and releasably maintaining said one element in any one of a number of longitudinal operative positions with respect to said other element.

4. Miter apparatus as set forth in claim 3, said one element comprising said spindle element.

References Cited by the Examiner

UNITED STATES PATENTS

| | | | |
|---|---|---|---|
| 1,894,010 | 1/1933 | Tautz | 143—169 |
| 1,960,590 | 5/1934 | McKay | 143—6.43 X |
| 2,630,146 | 3/1953 | Van Tuyl | 143—6.43 |
| 2,903,026 | 9/1959 | Frydenlund | 143—6.43 |

DONALD R. SCHRAN, *Primary Examiner.*